Patented Dec. 18, 1934

1,984,884

UNITED STATES PATENT OFFICE 1,984,884

PROCESS FOR PRODUCING OXYGENATED ORGANIC COMPOUNDS

Wilbur A. Lazier, Marshallton, Del., assignor to E. I. du Pont de Nemours & Company, Wilmington, Del., a corporation of Delaware No Drawing. Application June 6, 1928, Serial No. 283,447

15 Claims. (Cl. 260—156)

This invention relates to a process of preparing valuable organic compounds by catalytic hydrogenation-dehydrogenation reactions. It relates particularly to syntheses of organic compounds by the catalytic hydrogenation under pressure of oxides of carbon, e. g., carbon monoxide.

It is well known that valuable organic compounds may be produced by the catalytic hydrogenation under pressure of oxides of carbon, particularly carbon monoxide. According to numerous descriptions, the composition of the liquid products so produced is largely a function of variable operating conditions among which are the composition of the gaseous mixture, the temperature and composition of the contact mass, and the rate of gas passage over the catalyst. If the gas contains besides hydrogen and the oxides of carbon, a large proportion of ethylenic hydrocarbons, or if the oxides of carbon are present in large excess over the hydrogen, the resulting product consists largely of liquid hydrocarbons. The substantial absence of olefins or a lower concentration of carbon monoxide relative to the hydrogen favors the formation of alcohols, particularly methanol, and other oxygenated organic compounds such as acids, ketones, esters and aldehydes.

As catalytic bodies suitable for the formation of methanol and other oxygenated organic compounds, the hydrogenating metals other than those of the platinum group or those known to form methane readily from carbon monoxide and hydrogen, have previously been suggested. Such metals are copper, cadmium, silver, tin, lead and zinc, which may either be used alone or when promoted with non-reducible oxides or compounds of the alkali metals. Owing to their activity for methane formation, metals of the so-called iron group, i. e., iron, cobalt and nickel, are undesirable unless combined with some non-metallic elements such as arsenic, antimony, sulfur, phosphorus, or boron, or as solid solutions with non-methanating metals, or when combined with non-reducible oxides in such a way that no elementary metal is present under the conditions of operation. Among other catalysts which may be used are those oxides which are non-reducible to metals under the conditions of operation, especially when employed in intimate mixtures containing two or more oxides having different degrees of acidity or basicity.

It has been set forth in U. S. Patent 1,558,559 that the more basic oxide should preponderate. For example, a catalyst composed of zinc and chromium oxides should contain a proportion of zinc oxide greater than the amount necessary to form the neutral compound zinc chromate ($ZnCrO_4$), or in other words, over 2 mols ZnO against 1 mol chromic oxide. As the hexavalent form of chromium is not stable in the presence of a reducing gas, it readily passes over to the trivalent form, the corresponding oxide being chromium sesquioxide ($Cr_2O_3$), commonly called chromium oxide or chromic oxide. Therefore, in a catalyst containing a preponderating quantity of zinc oxide, the zinc oxide-chromium sesquioxide molecular ratio is greater than two. The basic zinc chromates of commerce, commonly prepared by precipitation, are compounds of this type, and are frequently referred to as especially suitable catalysts for the production of oxygenated organic compounds. These usually contain a large excess of zinc oxide, it being very difficult to prepare exactly neutral zinc chromate.

It is one of the objects of the present invention to carry out various hydrogenation and dehydrogenation reactions in a manner more satisfactory than has been the case heretofore. It is a further object to carry out these processes by the use of catalysts which are more efficient than those heretofore used. Further objects will be apparent from the following description.

According to the present invention, it is possible to obtain exceptionally good results by carrying out hydrogenation and dehydrogenation reactions in the presence of contact masses containing both basic and acidic oxides, the more acidic oxides preponderating. In other words, the catalyst used contains a greater proportion of the more acidic oxide than is necessary for the formation of a neutral salt. For example, in a zinc oxide-chromium oxide contact mass, the chromium oxide is present in excess over that amount necessary for the formation of neutral zinc chromate.

As one specific example, a contact mass suitable for use in the present processes may be prepared by gently igniting basic zinc ammonium chromate, either pure or admixed with sulphates or various alkali metal compounds, by which treatment a loosely constructed compound of zinc oxide and chromium sesquioxide, known as zinc chromite, is formed. The basic zinc ammonium chromate is a definite compound having a yellow color and of a crystalline character, and is represented by the formula $Zn(OH)(NH_4)CrO_4$. This compound decrepitates, when heated, with loss of oxygen and ammonia. When pure, basic zinc ammonium chromate, as well as its ignition product, obviously contains two molecular weights of zinc oxide for each molecular weight of chromium sesquioxide. However, whereas zinc chromate as generally prepared by precipitation always contains an excess of zinc oxide and hence is a basic zinc chromate, the double zinc and ammonium chromate always contains a slight excess of chromium oxide because of the unavoidable occlusion of ammonium bichromate in the product during its precipitation. Therefore, it is rarely possible by this method to obtain a product containing as much as two melocular weights of zinc oxide for each molecular weight of chromium sesquioxide. The ratio usually found in the commercial products is about 1.95. Good results are also obtained according to the process stated using catalysts in which zinc is replaced by manganese.

It is understood, of course, that other methods of preparing the chromite catalysts may be used. It is possible to prepare a suitable contact material by grinding in suitable mills a mixture of zinc oxide with ammonium bichromate in excess the mass being wet with water. In this manner it is possible to obtain any desired ratio of zinc oxide to chromium oxide. However, the use of a definite compound as the parent substance of the catalyst results in a contact mass in which there is a more intimate relationship between the basic and acidic oxide. Furthermore, the use of a decrepitating compound results in the formation of a highly porous residue well adapted to granulation by pressure.

The zinc chromite catalysts just described, when free from alkali metals, bring about the formation of practically pure methanol from reaction mixtures containing hydrogen and carbon monoxide. In order to obtain substantial quantities of higher alcohols, particularly normal propanol, isobutanol, and amyl alcohols, as well as acids, ketones, esters and aldehydes, we have found that the addition of small amounts of alkali metal compounds, particularly sodium compounds, is advantageous. Furthermore, contrary to prior practice, it has been found possible to operate at high space velocities with our catalysts even though they contain alkali metal compounds which are preferably used in small quantities. Potassium compounds, sodium compounds or mixtures of the two may be employed but it is generally more desirable to use the sodium compounds which are cheaper and more available.

The alkali metals may be introduced into the catalysts as sulphate, phosphate, chromate, hydroxide, or carbonate, or as the salt of any of the heavy metal oxygen acids or organic acids. Regardless of the form in which the alkali metal is introduced its ultimate effect in bringing about higher alcohol production is the same. Introduction of the alkali metal as the salt of a heavy metal oxygen acid, while temporarily postponing the attainment of maximum higher alcohol production, has the additional advantage of introducing a larger proportion of the acidic oxide. For example, the addition of sodium chromate or bichromate to the zinc oxide-chromium oxide catalyst already described has the twofold advantage of further increasing the preponderance of the chromium oxide over the zinc oxide and furnishing a support for the alkali metal compounds generated during the course of the reaction.

The advantages which accrue from the use of low concentrations of alkali metal compounds with my hydrogenation catalysts are many. The product obtained from the hydrogenation is homogeneous and relatively free from water, often containing as much as 40% of compounds of a higher order than methanol. Furthermore, there is formed little or no tarry matter and but a small proportion of hydrocarbons is produced as compared with the product from a reaction in which the catalyst used contains higher concentrations of alkali metal compound. The contact mass retains its good structure whereas in the presence of a higher concentration of alkali metal compound, the catalyst tends to sinter into a solid mass thereby impeding or preventing gas flow through the catalyst chamber. Furthermore, with the catalyst low in alkali metal compound, carbon deposition is at a minimum as contrasted with contact masses of greater alkali metal compound content.

In employing compounds of the alkali metals with our catalysts for the production of higher alcohols, it is preferred to use such an amount that the finished catalyst will contain from 0.25% to 5.0% of alkali metal calculated as the element, the amount varying within these limits depending upon the conditions of operation. For example, when operating at a temperature of 475° C. and 30,000 space velocity (30,000 liters of gas per hour, measured at 0° C. and 760 mm. of mercury, per liter of catalyst), a zinc oxide-chromium oxide catalyst containing about 2% of sodium gives especially good results.

The following is given as a specific example of carrying out the process:—

A contact mass is prepared by grinding together in the wet way the product resulting from the exothermic decomposition of a mixture of a precipitated basic zinc ammonium chromate with about 5% of its weight of anhydrous sodium chromate. The intimate mixture prepared is dried, granulated, and charged into a suitable pressure resistant catalyst chamber. Water-gas containing approximately 50% hydrogen and 35% carbon monoxide by volume with small percentages of carbon dioxide, methane, ethylene, and nitrogen is passed at a pressure of about 275 atmospheres over the contact mass at the rate of 40,000 liters per hour per liter of catalyst, the latter being heated to about 475° C. Under these conditions there is produced per hour a volume of condensable liquid organic compounds about equal to the volume of catalyst employed, containing about 40% each of methanol and higher boiling organic compounds, chiefly isobutanol.

As illustrating the improvement derived from the use of a catalyst containing but a small amount of alkali metal compound, as compared with a catalyst containing a large amount of such compound, a catalyst similar in every respect to that used in the specific process example given, except that it contains about 20% of potassium chromate (8% potassium) in place of 5% sodium chromate, when used in the process operated under the same conditions, produces per liter of catalyst per hour about 0.3 liters each of methanol and compounds having a higher molecular weight.

It has also been found that the catalysts which have been described as forming the subject matter of the present invention, in addition to their use as hydrogenation catalysts, may also be utilized for the reverse reaction, that is, dehydrogenation. For instance, a catalyst prepared as described from a mixture of basic zinc ammonium chromate with about 5% sodium chromate may be used as a dehydrogenating catalyst and when isopropanol is passed over such a catalyst heated to 400° C., it is converted almost completely to acetone. The process, of course, is carried out under pressures above atmospheric.

It is to be understood that the present invention covers the field of catalysis, both as applied to hydrogenation as well as dehydrogenation. These catalytic processes are generally carried out at temperatures around 475° C. and at a pressure of around 275 atmospheres. However, in general, the processes may be carried out at temperatures of from 375° to 500° C. with the use of pressures ranging from 100 to 1,000 atmospheres.

This application is a continuation in part of my copending application No. 115,692, now Patent No. 1,746,782.

As many apparently widely different embodiments of this invention may be made without departing from the spirit and scope thereof, it is to be understood that I do not limit myself to the specific embodiments thereof except as defined in the appended claims.

I claim:

1. In a catalytic process of forming organic compounds in a three-component reaction system comprising an oxygen-containing carbon compound capable of hydrogenation, an oxygen-containing carbon compound capable of dehydrogenation, and hydrogen, the step which comprises using a catalyst which, prior to introduction into said reaction system, contains difficultly reducible basic and acidic oxides, a material amount of said oxides being in loose chemical combination, the acidic oxide or oxides preponderating in the catalyst.

2. The process of synthesizing oxygenated organic compounds which comprises passing a gas mixture containing hydrogen and an oxide of carbon over a catalyst at elevated temperature and pressure, said catalyst containing difficultly reducible basic and acidic oxides, said oxides being, at least in part, chemically combined, with the acidic oxide preponderating in excess of that necessary to form a neutral compound with the basic compound, and containing also an alkali metal compound.

3. The process of synthesizing oxygenated organic compounds which comprises passing a mixture of hydrogen with carbon monoxide at elevated temperature and pressure over a zinc oxide-chromium oxide catalyst in which there is a preponderance of chromium oxide, said zinc and chromium oxides being, at least in part, chemically combined, and containing also an alkali metal compound.

4. The process of synthesizing oxygenated organic compounds which comprises passing a mixture of hydrogen with carbon monoxide over a catalyst at elevated temperature and pressure, said catalyst containing chromium sesquioxide and zinc oxide, said zinc and chromium oxides being, at least in part, chemically combined, the ratio of chromium to zinc being in excess of that existing in neutral zinc chromate and said catalyst containing also an alkali metal compound.

5. The process of synthesizing oxygenated organic compounds which comprises passing a gas mixture containing hydrogen and an oxide of carbon over a catalyst at elevated temperature and pressure, said catalyst containing difficultly reducible basic and acidic oxides, said acidic and basic oxides being, at least in part, chemically combined, with the acidic oxide preponderating in excess of that necessary to form a neutral compound with the basic oxide, and containing also 0.25% to 5.0% of alkali metal, calculated as the element.

6. The process of synthesizing oxygenated organic compounds which comprises passing a mixture of hydrogen with carbon monoxide at elevated temperature and pressure over a zinc oxide-chromium oxide catalyst in which there is a preponderance of chromium oxide, said zinc and chromium oxides being, at least in part, chemically combined, and which contains also 0.25% to 5.0% of alkali metal, calculated as the element.

7. The process of synthesizing oxygenated organic compounds which comprises passing a mixture of hydrogen with carbon monoxide at elevated temperature and pressure over a zinc oxide-chromium oxide catalyst in which there is a preponderance of chromium oxide, which contains also about 5% of its weight of anhydrous sodium chromate, said zinc and chromium oxides being, at least in part, chemically combined.

8. The process of synthesizing oxygenated organic compounds which comprises passing a mixture of hydrogen with carbon monoxide at elevated temperature and pressure, said catalyst containing chromium sesquioxide and zinc oxide, said oxides being, at least in part, chemically combined, the ratio of chromium to zinc being in excess of that existing in neutral zinc chromate, containing also about 5% of its weight of anhydrous sodium chromate.

9. The process of synthesizing oxygenated organic compounds consisting in passing a mixture of hydrogen and oxide of carbon over a catalyst containing a material amount of a chromite wherein the chromium oxide preponderates over the more basic constituent.

10. The process of synthesizing oxygenated organic compounds which comprises passing a mixture of hydrogen and oxide of carbon over a catalyst containing a material amount of a zinc chromite wherein the chromium oxide constituent preponderates.

11. The process of synthesizing oxygenated organic compounds which comprises passing a mixture of hydrogen and oxide of carbon over a catalyst containing a material amount of a chromite formed from difficultly reducible basic and acidic oxides with the chromium oxide preponderating in excess of that necessary to form a neutral compound with the basic oxide.

12. The process of synthesizing oxygenated organic compounds by passing a mixture of hydrogen and oxide of carbon over a catalyst containing a material amount of a compound formed by combining difficultly reducible basic and acidic oxides with the acidic oxide preponderating.

13. A process for producing oxygenated organic compounds comprising passing a mixture of hydrogen and an oxide of carbon over a catalyst which is prepared by igniting basic zinc ammonium chromate prepared by precipitation from a solution of the zinc and chromium salts.

14. A process for producing oxygenated organic compounds comprising passing a mixture of hydrogen and an oxide of carbon over a catalyst containing the product resulting from the exothermic decomposition of a mixture of a precipitated basic zinc ammonium chromate and about 5% of its weight of anhydrous sodium chromate.

15. A process for producing oxygenated organic compounds comprising passing a mixture of hydrogen and an oxide of carbon over a catalyst containing a material amount of zinc and chromium oxides in loose chemical combination and in which the chromium oxide preponderates, said catalyst being prepared by precipitation from a solution of salts of zinc and chromium and subsequent ignition of the precipitate.

WILBUR A. LAZIER.